(12) United States Patent
Lewis et al.

(10) Patent No.: US 11,109,109 B2
(45) Date of Patent: *Aug. 31, 2021

(54) METHODS, SYSTEMS, AND MEDIA FOR PROVIDING VIDEO CONTENT SUITABLE FOR AUDIO-ONLY PLAYBACK

(71) Applicant: Google LLC, Mountain View, CA (US)

(72) Inventors: Justin Lewis, South San Francisco, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,425

(22) Filed: May 18, 2020

(65) Prior Publication Data

US 2020/0280768 A1    Sep. 3, 2020

Related U.S. Application Data

(63) Continuation of application No. 14/820,233, filed on Aug. 6, 2015, now Pat. No. 10,659,845.

(51) Int. Cl.
*H04N 5/445* (2011.01)
*H04N 21/485* (2011.01)
(Continued)

(52) U.S. Cl.
CPC ....... *H04N 21/4852* (2013.01); *H04N 21/233* (2013.01); *H04N 21/23439* (2013.01);
(Continued)

(58) Field of Classification Search
CPC ............. H04N 21/4852; H04N 21/233; H04N 21/47202; H04N 21/23439;
(Continued)

(56) References Cited

U.S. PATENT DOCUMENTS 8,813,161 B2    8/2014  Lv
8,850,355 B2    9/2014  Bennetts et al.
(Continued)

FOREIGN PATENT DOCUMENTS

CN    102347058    2/2012
CN    102595204    7/2012
(Continued)

OTHER PUBLICATIONS

Examination Report dated Nov. 4, 2019 in EP Patent Application No. 16758001.8.
(Continued)

*Primary Examiner* — Jefferey F Harold
*Assistant Examiner* — Sahar Aqil Riaz
(74) *Attorney, Agent, or Firm* — Byrne Poh LLP

(57) ABSTRACT

Methods, systems, and media for selecting content to be presented are provided. In some embodiments, the methods comprise: receiving a request for a first video content item from a user device; receiving an indication that the user device is in a background playback mode; determining that the first video content item is not suitable for presentation in the background playback mode based on one or more properties of audio data; based on the determining that the first video content item is not suitable for presentation in the background playback mode, selecting a second video content item that is suitable for presentation in the background playback mode based on the one or more properties of the audio data of the second video content item; and in response to selecting the second video content item, causing the second video content item to be presented by the user device.

19 Claims, 6 Drawing Sheets

(51) Int. Cl.
*H04N 21/2343* (2011.01)
*H04N 21/258* (2011.01)
*H04N 21/2662* (2011.01)
*H04N 21/439* (2011.01)
*H04N 21/442* (2011.01)
*H04N 21/462* (2011.01)
*H04N 21/233* (2011.01)
*H04N 21/472* (2011.01)
*H04N 21/81* (2011.01)

(52) U.S. Cl.
CPC ... *H04N 21/25825* (2013.01); *H04N 21/2662* (2013.01); *H04N 21/439* (2013.01); *H04N 21/44213* (2013.01); *H04N 21/4621* (2013.01); *H04N 21/47202* (2013.01); *H04N 21/8153* (2013.01)

(58) Field of Classification Search
CPC ......... H04N 21/25825; H04N 21/2662; H04N 21/439; H04N 21/44213; H04N 21/4621; H04N 21/8153
USPC .............................................. 725/43, 47, 87
See application file for complete search history.

(56) References Cited

U.S. PATENT DOCUMENTS

| | | | |
|---|---|---|---|
| 9,071,867 B1* | 6/2015 | Ray | H04N 21/4223 |
| 9,253,229 B1 | 2/2016 | Strothmann et al. | |
| 9,571,870 B1* | 2/2017 | Wilson | G10L 15/005 |
| 9,652,112 B2* | 5/2017 | Steiner | H04L 65/60 |
| 2004/0187027 A1 | 9/2004 | Chan | |
| 2004/0255761 A1 | 12/2004 | Yamane et al. | |
| 2005/0244140 A1 | 11/2005 | Blacquiere | |
| 2010/0056272 A1 | 3/2010 | Dutilly et al. | |
| 2011/0217019 A1 | 9/2011 | Kamezawa et al. | |
| 2012/0209413 A1 | 8/2012 | Xu et al. | |
| 2013/0070093 A1 | 3/2013 | Rivera et al. | |
| 2013/0124462 A1 | 5/2013 | Bryan et al. | |
| 2013/0162667 A1 | 6/2013 | Eskolin et al. | |
| 2013/0346588 A1 | 12/2013 | Zhang et al. | |
| 2014/0068436 A1* | 3/2014 | Steiner | H04L 65/4084 715/719 |
| 2014/0280781 A1 | 9/2014 | Gregotski | |
| 2014/0310743 A1 | 10/2014 | Des Jardins | |
| 2015/0135049 A1 | 5/2015 | Murphy | |
| 2015/0143239 A1 | 5/2015 | Birkbeck et al. | |
| 2015/0185993 A1* | 7/2015 | Wheatley | G06F 3/013 715/744 |
| 2015/0189377 A1 | 7/2015 | Wheatley et al. | |
| 2015/0213839 A1 | 7/2015 | Woodman et al. | |
| 2016/0216934 A1 | 7/2016 | Guy et al. | |

FOREIGN PATENT DOCUMENTS

| | | |
|---|---|---|
| CN | 104810033 | 7/2015 |
| EP | 2713622 | 4/2014 |
| RU | 2308098 | 10/2007 |
| WO | WO 2004086396 | 10/2004 |
| WO | WO 2014152047 | 9/2014 |

OTHER PUBLICATIONS

International Search Report and Written Opinion dated Nov. 4, 2016 in International Patent Application No. PCT/US2016/044857.
Notice of Allowance dated Jan. 10, 2020 in U.S. Appl. No. 14/820,233.
Office Action dated Jan. 4, 2018 in U.S. Appl. No. 14/820,233.
Office Action dated Jan. 20, 2020 in CN Patent Application No. 201680025050.2.
Office Action dated Jan. 29, 2019 in U.S. Appl. No. 14/820,233.
Office Action dated Jun. 15, 2017 in U.S. Appl. No. 14/820,233.
Office Action dated Jun. 19, 2018 in U.S. Appl. No. 14/820,233.
Office Action dated Sep. 3, 2018 in RU Patent Application No. 2017133793.
Examination Report dated May 7, 2020 in EP Patent Application No. 16758001.8.
Office Action dated Aug. 18, 2020 in BR Patent Application No. BR112017019131-8.

\* cited by examiner

METHODS, SYSTEMS, AND MEDIA FOR PROVIDING VIDEO CONTENT SUITABLE FOR AUDIO-ONLY PLAYBACK

CROSS-REFERENCE TO RELATED APPLICATION

This application is a continuation of U.S. patent application Ser. No. 14/820,233, filed Aug. 6, 2016, which is hereby incorporated by reference herein in its entirety.

TECHNICAL FIELD

The disclosed subject matter relates to methods, systems, and media for providing video content suitable for audio-only playback.

BACKGROUND

Content sources, such as video hosting services, provide users with the opportunity to view content, such as video content. Some of this video content includes music or other audio that may be appreciated separately from the visual content of the video. However, if a content source were to provide content for audio-only playback, some of the content may not be enjoyable to a user. This may lead to users becoming dissatisfied with the content sources provision of audio-only playback and frequent skipping of content that the user finds to be unenjoyable.

Accordingly, it is desirable to provide methods, systems, and media for providing video content suitable for audio-only playback.

SUMMARY

In accordance with various embodiments of the disclosed subject matter, methods, systems, and media for providing video content suitable for audio-only playback are provided.

In accordance with some embodiments of the disclosed subject matter, a method for selecting content to be presented is provided, the method comprising: receiving, using a hardware processor, a request for a first video content item from a user device; receiving an indication that the user device is currently in a background playback mode; determining that the first video content item is not suitable for presentation in the background playback mode based on one or more properties of audio data of the first video content item; based on the determining that the first video content item is not suitable for presentation in the background playback mode, selecting a second video content item that is suitable for presentation in the background playback mode, wherein the second video content item has been determined to be suitable for presentation in the background playback mode based on the one or more properties of the audio data of the second video content item; and in response to selecting the second video content item, causing the second video content item to be presented by the user device.

In accordance with some embodiments of the disclosed subject matter, a system for selecting content to be presented is provided, the system comprising: a hardware processor that is programmed to: receive a request for a first video content item from a user device; receive an indication that the user device is currently in a background playback mode; determine that the first video content item is not suitable for presentation in the background playback mode based on one or more properties of audio data of the first video content item; based on the determining that the first video content item is not suitable for presentation in the background playback mode, select a second video content item that is suitable for presentation in the background playback mode, wherein the second video content item has been determined to be suitable for presentation in the background playback mode based on the one or more properties of the audio data of the second video content item; and in response to selecting the second video content item, cause the second video content item to be presented by the user device.

In accordance with some embodiments of the disclosed subject matter, a non-transitory computer-readable medium containing computer executable instructions that, when executed by a processor, cause the processor to perform a method for selecting content to be presented is provided, the method comprising: receiving a request for a first video content item from a user device; receiving an indication that the user device is currently in a background playback mode; determining that the first video content item is not suitable for presentation in the background playback mode based on one or more properties of audio data of the first video content item; based on the determining that the first video content item is not suitable for presentation in the background playback mode, selecting a second video content item that is suitable for presentation in the background playback mode, wherein the second video content item has been determined to be suitable for presentation in the background playback mode based on the one or more properties of the audio data of the second video content item; and in response to selecting the second video content item, causing the second video content item to be presented by the user device.

In accordance with some embodiments of the disclosed subject matter, a system for selecting content to be presented is provided, the system comprising: means for receiving a request for a first video content item from a user device; means for receiving an indication that the user device is currently in a background playback mode; means for determining that the first video content item is not suitable for presentation in the background playback mode based on one or more properties of audio data of the first video content item; means for based on the determining that the first video content item is not suitable for presentation in the background playback mode, selecting a second video content item that is suitable for presentation in the background playback mode, wherein the second video content item has been determined to be suitable for presentation in the background playback mode based on the one or more properties of the audio data of the second video content item; and means for causing the second video content item to be presented by the user device responsive to the means for selecting the second video content item.

In some embodiments, in the background playback mode the user device presents audio data of video content items while presentation of video data of the video content item is inhibited.

In some embodiments, the means for determining that the first video is not suitable for presentation is utilized prior to receiving the request for the first video content item, and wherein the system further comprises: means for setting a flag associated with the first video content item indicating that the first video content item is not suitable for presentation in the background playback mode; means for determining that the first video content item is not suitable for presentation in the background playback mode based on the flag; and wherein the means for selecting the second video is responsive to the flag indicating that the first video content item is not suitable for presentation in the background playback mode.

In some embodiments, the means for determining that the first video content item is not suitable for presentation in the background playback mode comprises: means for determining a proportion of the audio data of the first video content item that does not include music; means for determining a proportion of users that skipped the first video content item when the users were presented with the first video content item in the background playback mode; and means for determining that the first video content item is not suitable for presentation in the background playback mode based on at least the proportion of the audio data of the first video content item that does not include music and the proportion of users that skipped the first video content item.

In some embodiments, the system further comprises, means for causing a user associated with the first video content item to be notified that the first video content item is not suitable for background playback responsive to the means for determining that the first video content item is not suitable for presentation in the background playback mode.

In some embodiments, the system further comprises: means for determining that an end portion of the second video content item includes no music; and means for causing the user device to skip presentation of the end portion that includes no music.

In some embodiments, the request for the first video content item is a request for a next video content item in a playlist of video content items, and wherein the second video content item is the next video content item in the playlist after the first video content item.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
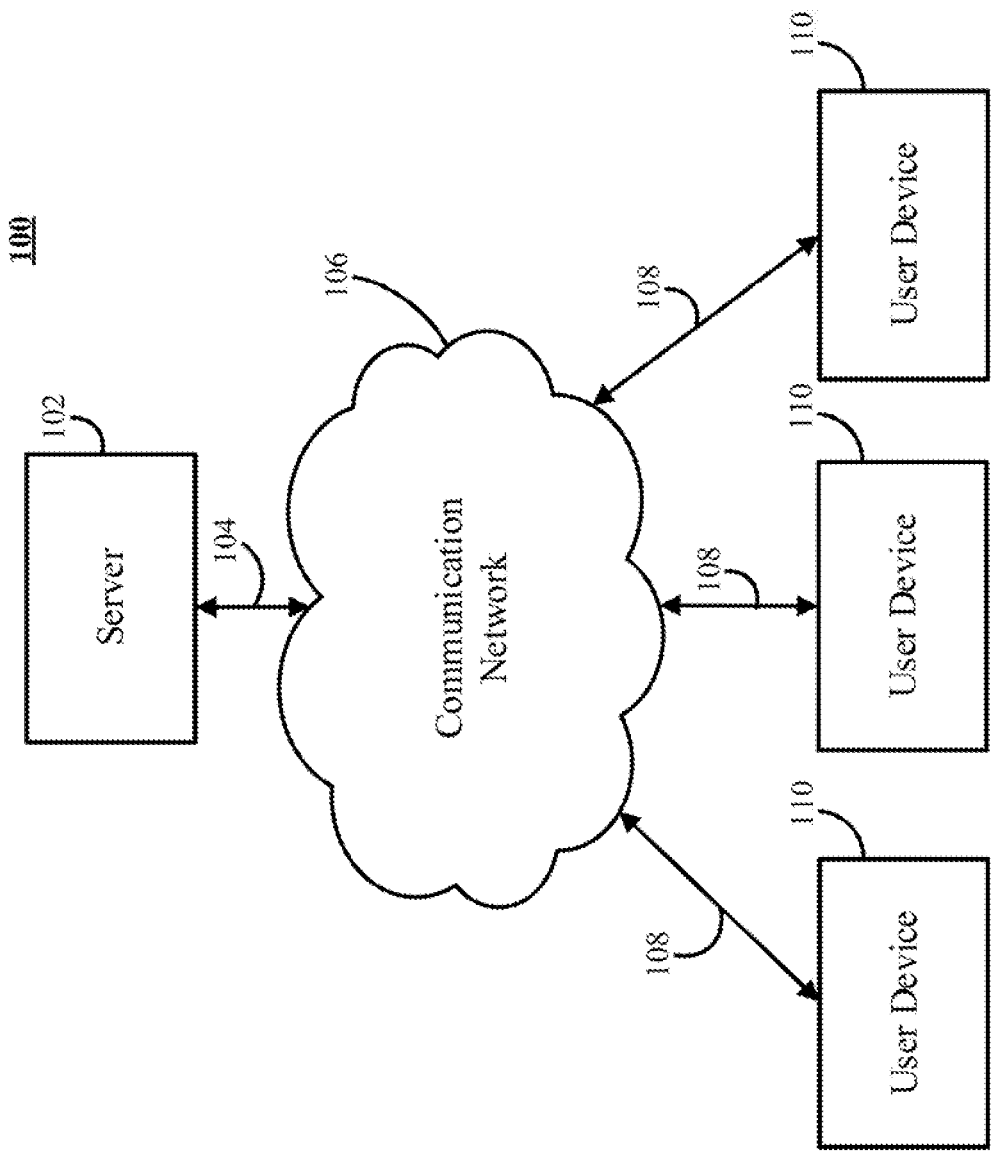
FIG. 1 shows an example of a generalized schematic diagram of a system on which the mechanisms for providing video content suitable for audio-only playback as described herein can be implemented in accordance with some embodiments of the disclosed subject matter.

In accordance with various embodiments, mechanisms (which can include methods, systems, and/or media) for providing video content suitable for audio-only playback are provided.

In some embodiments, the mechanisms described herein can receive a request for one or more content items, such as videos, and/or any other suitable content items, from a user device. In some embodiments, these content items can be include audio data and visual data (e.g., image data and/or video data). For example, the mechanisms described herein can be associated with a video hosting service, and the request for one or more content items can be a request for a particular video received from a smartphone.

In some embodiments, the mechanisms described herein can determine that the user device requesting the content is in a background playback mode in which the audio data included in the content item is to be presented, but the visual data of the content item is either inhibited from being presented or is unlikely to be viewed by a user even if it were to be presented. For example, a smartphone that is requesting the content can be executing a video player application that, when executed by the smartphone can present audio and video data of a video content item. In such an example, the smartphone can be in a background playback mode when the video player application is minimized, and can be configured to present only the audio data of video content items that are to be presented.

In some embodiments, the mechanisms described herein can determine if the requested content items are suitable for presentation in the background playback mode. The mechanisms can evaluate any suitable properties of the one or more content items to determine whether the one or more content items are suitable for presentation in background playback mode, such as the presence or absence of a lengthy introduction (e.g., dialogue) to the content item before music starts, the presence or absence of periods of silence or only noise, the presence of periods of dialogue, the audio quality of the content item, repetitiveness in the audio data (e.g., where the audio data is unvaried over a relatively large portion of the content item), etc. For example, if the particular video requested by the smartphone includes a long silence at the end (e.g., with visual information and/or user interface elements prompting a user to subscribe to content from a user associated with the particular video) and/or the audio data is of poor quality, the mechanisms described herein can determine that the particular video is not suitable for background playback.

In some embodiments, the mechanisms described herein can respond to the request for a particular content item with a different content item that is suitable for presentation in the background playback mode when the particular content item is determined to be not suitable for presentation in the background playback mode. For example, if the mechanisms described herein determine that the particular video requested by the smartphone is not suitable for background playback, the mechanisms described herein can respond to the request with a substitute video. The substitute video can be a next video in a playlist of videos that the smartphone was requesting videos from, or a video that includes the same song as the particular video, but that is more suitable for presentation in the background playback mode.

FIG. 1 shows an example 100 of a generalized schematic diagram of a system on which the mechanisms for providing video content suitable for audio-only playback as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for providing video content suitable for audio-only playback, such as a processor, a computer, a data processing device, or any suitable combination of such devices. For example, the mechanisms for providing video content suitable for audio-only playback can be distributed into multiple backend components and multiple frontend components and/or user interfaces. In a more particular example, backend components, such as mechanisms for receiving requests for one or more content items, determining if each of the requested content items is suitable for audio-only playback, providing access to content items, etc., can be performed on one or more servers 102. In another more particular example, frontend components, such as presentation of a user interface, initiating requests for content items, entering a background playback mode, receiving content items, presenting content items, etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a smartphone, a tablet computer, a mobile telephone, a wearable computer, a vehicle (e.g., an automobile, a boat, an airplane, or any other suitable vehicle) entertainment system (e.g., a radio, a built-in display, etc.), a personal computer, a laptop computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for providing video content suitable for audio-only playback. For example, system 100 can include a content discovery server 102 that facilitates discovery of content available from a content platform using the mechanisms described herein, a content delivery server 102 that responds to requests for the content by causing the requested content to be transmitted to user device 110 that requested the content, a content evaluation server 102 that determines whether a particular content item is suitable for background playback, and/or any other suitable servers for performing any suitable functions of the mechanisms described herein and/or any other suitable functions.

Figure 2:
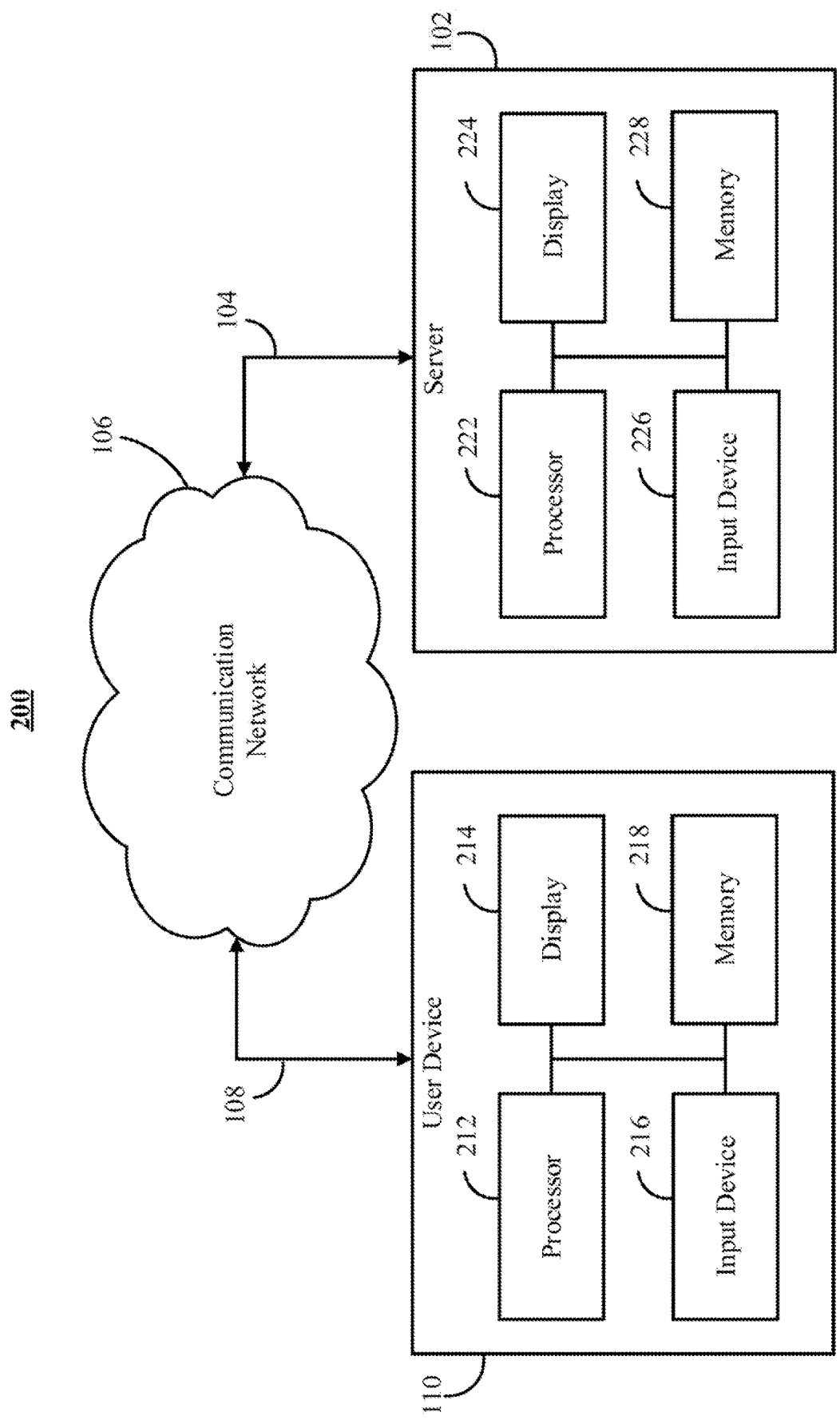
FIG. 2 shows an example of hardware that can be used to implement one or more user devices and servers depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for initiating requests for content, entering a background playback mode, presenting content items, presenting a user interface for controlling playback of content items while in background playback mode, sending and receiving data through communications link 108, and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., skipping of content in background playback mode, input from an owner and/or uploader of a content item indicating suitability for background playback, etc.), and hardware processor 222 can receive requests for content from user devices 110 that are in background playback mode and transmit content that is suitable for background playback to be presented by user device 110 (e.g., as described below in connection with process 300 of FIG. 3). In some embodiments, the server program can cause hardware processor 222 to, for example, execute one or more portions of process 300 as described below in connection with FIG. 3.

Hardware processor 222 can use the server program to communicate with user devices 110 as well as provide access to and/or copies of mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for providing video content suitable for audio-only playback. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
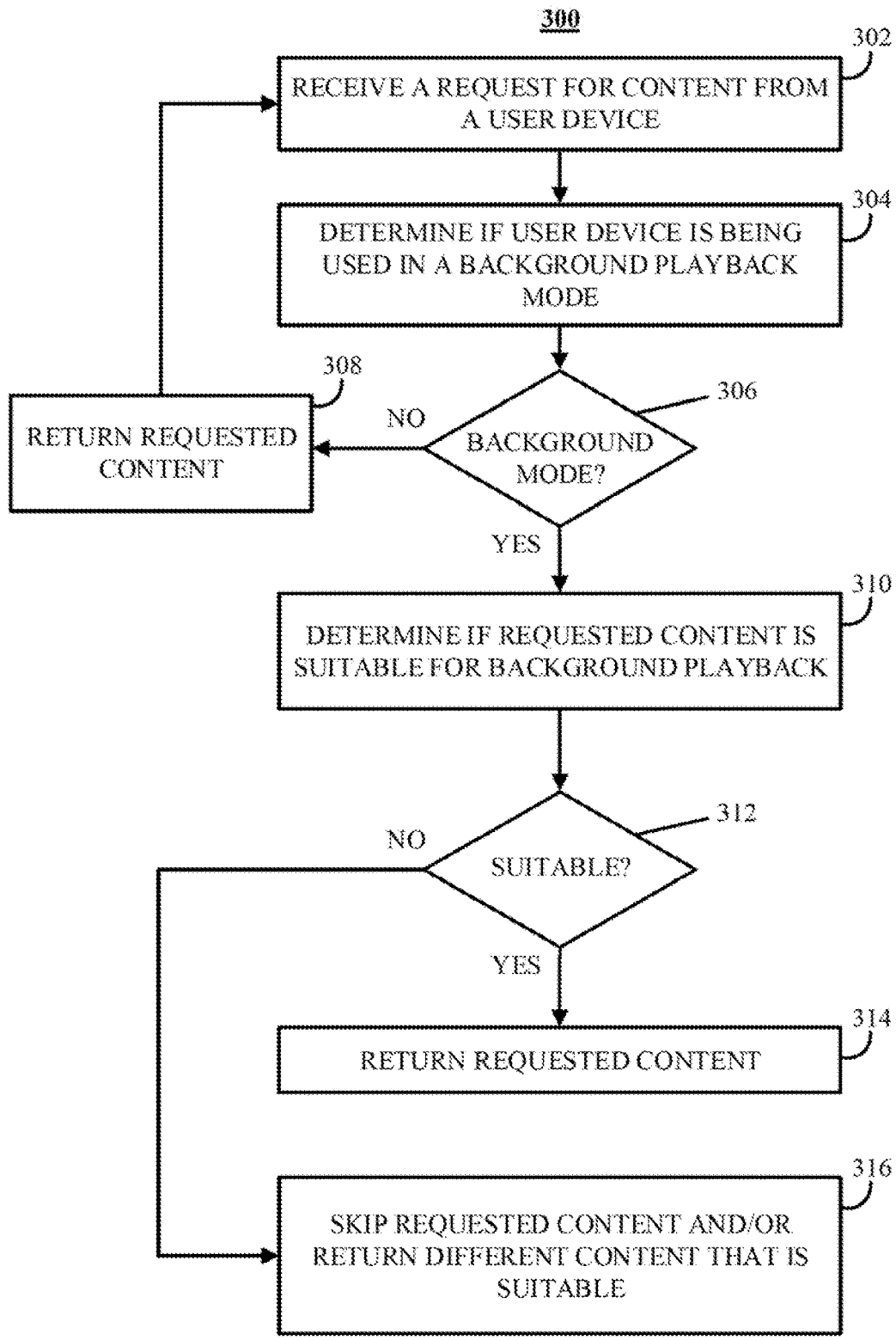
FIG. 3 shows an example of a process for providing video content suitable for audio-only playback in accordance with some embodiments of the disclosed subject matter.

Turning to FIG. 3, an example 300 of a process for providing video content suitable for audio-only playback is shown in accordance with some embodiments of the disclosed subject matter. At 302, process 300 can receive a request for content from a user device. In some embodiments, the request for content can be received using any suitable technique or combination of techniques. In some embodiments, a content item requested by the user device can include any suitable content and can be associated with any suitable content source. For example, a content item can include media content such as video content, audio content, text content (e.g., a blog post, a link to a web page and/or a portion of a web page, a news story, an electronic book, a document, etc.), etc., and/or any suitable combination of media content. As another example, a content item can include user generated content, such as a social media post, a micro-blog post, etc., created by a social connection of the first user (and/or any other suitable user) which can include audio and/or video content. As yet another example, a content item can include user generated content that includes media content from another source (e.g., as embedded content, as a link to the media content, etc.).

In some embodiments, the request received at 302 can include a request for one or more particular content items (e.g., as a request for a web page and/or content corresponding to the one or more content items). For example, the request can include a uniform resource locator (URL) corresponding to a particular content item or content items. As another example, the request can include one or more identifiers that can be used to identify a particular content item or content items. In a more particular example, the request for content can be a request for multiple content items, such as a playlist of content items. In another more particular example, the request for content can be a request for a content item that is sent from a group of multiple content items (e.g., such as a playlist of content items).

Additionally or alternatively, in some embodiments, the request can be a request for one or more content items that satisfy one or more criteria associated with the request. For example, the request can be a search query associated with one or more keywords (and/or any other suitable criteria) associated with the search query. As another example, the request can be a request for recommended content items (e.g., a feed of content items from social connections of a user). In such an example, the recommended content items can be selected by a source of the content (e.g., a video sharing service, a video hosting service, etc.) using any suitable technique or combination of techniques. In a more particular example, the recommended content items can be selected by the source of the content based on relevance to one or more content items that have previously been presented by a user device requesting the recommended content. In another more particular example, a user associated with the user device requesting the recommended content can be grouped with similar users (e.g., based on similar requested content, based on indications that the group of users enjoy similar content, based on indications that the group of users dislike similar content, etc.), and content can be recommended based on content that other users in the group of similar users have enjoyed. As still another example, the request can be a request for a next content item in a list without specifying the identity of the content item. In such an example, a device executing process 300 (and/or any other suitable device) can identify a next content item using any suitable technique or combination of techniques.

At 304, process 300 can determine if the user device requesting the content is being used in a background playback mode. Process 300 can use any suitable technique or combination of techniques to determine whether the user device is in a background playback mode. In some embodiments, a user device can be in a background playback mode when it can be determined that the user is likely not paying attention to a visual portion of a content item. For example, a user device can be in a background playback mode if content from a video content item is being presented, but only the audio portion of the content is actually being presented to a user. In a more particular example, a user device can be in a background playback mode if audio data included in the video content is being presented, but video data included in the video content item is not being presented.

In some embodiments, a user device can be in a background playback mode if a user interface of an application being used to present a content item is not currently being presented on a display of the user device. For example, if the application has been minimized but continues to present at least an audio portion of the content, the user device can be in a background playback mode with respect to the application. As another example, if the user interface of the application is being executed by the user device, but the user interface of the application is not in the foreground (e.g., another user interface is being presented that overlaps at least a substantial portion of the user interface of the application), the user device can be in a background playback mode with respect to the application. In a more particular example, if the user interface of the application is presented using a first tab or window of a browser application and a second tab or window of the browser application is presented in front of or in lieu of the first tab, the user device can be in a background playback mode with respect to the application in the first tab.

As yet another example, if a user device executing the application has been placed into a locked state and/or any other state in which a visual portion of the content is not presented to a user but an audio portion of the content continues to be presented, the user device can be in a background playback mode with respect to the application. In a more particular example, in some embodiments, a user device can include one or more sensors (e.g., light detectors, accelerometers, etc.) that can detect whether a display of the user device is obscured or otherwise not being viewed by a user. In such examples, the sensors can determine that the display of the user device is obscured or otherwise not being viewed by a user when the device is display side down on a surface (e.g., a table or desk), in a pocket or bag, etc.

As still another example, the application can be executed in a background playback mode in response to a user input placing the application into background playback mode. In a more particular example, the application can include a user interface element that, when selected, causes the application to present content in a background playback mode.

In some embodiments, process 300 can determine that the user device requesting the content at 302 is being used in background playback mode using any suitable information that is received from the user device. For example, the request for content can be associated with an indication of the status of the user device. In a more particular example, the indication can be a flag, a tag and/or other indicator that is transmitted as part of the request and/or that is associated with an address at which the request is received (e.g., a request for content in a non-background playback mode can be sent to one address, and a request for content in a background playback mode can be sent to a different address). As another example, process 300 can receive an indication of the status of the user device independently of the request for content. In such an example, when the user device enters a background playback mode, the user device can send an indication to a device executing process 300 (and/or any other suitable process) that indicates that the device is currently operating in a background playback mode, has transitioned to a background playback mode and/or has transitioned from a background playback mode. As yet another example, process 300 can receive information from the user device that can be used to infer whether the application is in a background playback mode. In such an example, such information can be information related to whether a user is paying attention, how long it has been since a user input was received, etc.

At 306, if process 300 does not determine that the user device is in a background playback mode ("NO" at 306), process 300 can move to 308. At 308, process 300 can cause the requested content to be transmitted to the user device that requested the content.

Otherwise, if process 300 determines that the user device is in a background playback mode ("YES" at 306), process 300 can move to 310.

At 310, process 300 can determine if the requested content is suitable for background playback. Process 300 can use any suitable technique or combination of techniques to determine if the requested content is suitable for background playback. For example, in some embodiments, process 300 can determine if the requested content is suitable for background playback based on an indication associated with the content. In a more particular example, process 300 can determine based on the state and/or presence of an indicator (e.g., a flag, a tag, etc.) associated with the content indicating the suitability of the content for background playback. In such an example, the indicator can be determined prior to the request for the content being received from the user device (e.g., by a server executing process 300, by a different server that determines the background playback suitability of content items, etc.).

As another example, in some embodiments, process 300 (and/or any other suitable process, such as process 400 described below in connection with FIG. 4) can determine the suitability of the requested content for background playback in response to receiving the request. In some embodiments, process 300 (and/or any other suitable process) can determine the suitability of a content item for background playback based on one or more factors such as: the amount and/or length of silences in audio data of the content item; the amount and/or length of audio that includes dialogue but no music; the proportion of users that have skipped the content item when it is presented in background playback mode; the presence or absence of an indication that the content item is an "official" version of the content included in the content item; the overall length of the content item; the audio quality of at least a portion of the content item; whether the content item is part of a playlist with other content items that have already been determined to be suitable for background playback; whether the content item depicts a cover of a song; a proportion of a work (e.g., a song) included in the content item; and/or any other suitable factor or factors.

In some embodiments, process 300 (and/or any other suitable process) can determine the suitability of a content item for background playback based at least in part on the amount and/or length of silences in audio of the content item. In such embodiments, relatively long periods of silence (e.g., more than two seconds, five seconds, etc.) in the content item can indicate that the content item is less suitable for background playback. Additionally, in some embodiments, periods of silence only at the beginning and/or end can indicate that the content item may be suitable for background playback if the silence at the beginning and/or end were skipped and/or removed. In some embodiments, process 300 (and/or any other suitable process) can determine the total proportion of audio of the content item that includes silence. For example, if process 300 (and/or any other suitable process) determines that a relatively large portion of the content item includes silence (e.g., ten percent, fifteen percent, etc.), process 300 (and/or any other suitable process) can determine that the content item is not suitable and/or is likely to be suitable for background playback. Additionally or alternatively, in some embodiments, process 300 (and/or any other suitable process) can determine the suitability of a content item for background playback based at least in part on the amount and/or length of audio that includes dialogue but no music (e.g., when the content item that is requested is a content item of the song as opposed to, for example, an audio book, a podcast, a video blog, etc.).

In some embodiments, when a content item is transmitted to a user device and/or when a content item is presented by a user device, a portion at the beginning and/or the end that includes silence or dialogue with no music can be automatically skipped over by the user device based on metadata associated with the content item and/or based on instructions transmitted to the user device to skip a particular portion of a content item. Additionally or alternatively, when a portion is identified as a portion to be skipped (e.g., due to a period of silence at the beginning of a content item), a content server can be instructed to skip transmission of that portion (e.g., rather than the portion being skipped by the user device). For example, if a music video includes a portion at the end that has no music, a content server can stop streaming the music video to a user device in background playback mode upon reaching the end portion.

In some embodiments, process 300 (and/or any other suitable process) can determine the suitability of a content item for background playback based at least in part on the proportion of users that have skipped the content item when it is presented in background playback mode. For example, process 300 can compare the number and/or proportion of times that the content item has been skipped when it was presented in a background playback mode to the number and/or proportion of times that the content item has been skipped when it was presented in a non-background playback mode. As another example, process 300 can compare the number and/or proportion of times that the content item has been skipped when it was presented in a background playback mode to a threshold number and/or proportion of times that a content item suitable for background playback is skipped in background playback (e.g., an average number and/or proportion of times that content items are skipped in background playback mode).

In some embodiments, process 300 (and/or any other suitable process) can determine the suitability of a content item for background playback based at least in part on the presence or absence of an indication that the content item is an "official" version of the content included in the content item. In some embodiments, a content item can be determined (by process 300 and/or any other suitable process) to be an official version if the content item is from a verified source and/or if the content item is part of a playlist of content items that are all from the same source. Any suitable technique or combination of techniques can be used to determine if a content item is from a verified source. Additionally, in some embodiments, a determination of whether a content item is "official" can be performed at any suitable time (e.g., in response to receiving a request for the content item, prior to receiving a request for the content item, etc.), and the request for the content item need not be generated based on the playlist or related to the playlist in order for the presence of the content item in the playlist to be used in determining that the content item is "official." In some embodiments, whether a content item is an "official" version can be indicated by a flag, tag and/or any other suitable indicator that identifies the content item as an "official" version. Additionally or alternatively, process 300 (and/or any other suitable process) can determine that the content item is an "official" version as needed, and an indicator may not be present or required.

In some embodiments, process 300 (and/or any other suitable process) can determine the suitability of a content item for background playback based at least in part on the overall length of the content item. For example, in some embodiments, if the content item is less than a threshold length (e.g., ten seconds, twenty seconds, etc.), process 300 (and/or any other suitable process) can determine that the content item is not suitable for background playback. As another example, if the content item is less than a first threshold length (e.g., one minute, two minutes, etc.) and/or more than a second threshold length (e.g., five minutes, ten minutes, etc.), process 300 (and/or any other suitable process) can determine the suitability of the content item for background playback based on how far the length of the content item is from the threshold length.

In some embodiments, process 300 (and/or any other suitable process) can determine the suitability of a content item for background playback based at least in part on the audio quality of the content item. For example, process 300 (and/or any other suitable process) can determine if the content item meets at least a threshold level of audio quality. As another example, process 300 (and/or any other suitable process) can determine if the content item includes static and/or other undesirable noise.

In some embodiments, process 300 (and/or any other suitable process) can determine the suitability of a content item for background playback based at least in part on whether the content item is part of a playlist with other content items that have already been determined to be suitable for background playback. For example, process 300 (and/or any other suitable process) can determine that the presence of other content items that have been determined to be suitable for background playback increases the likelihood that the content item is suitable for background presentation.

In some embodiments, process 300 (and/or any other suitable process) can determine the suitability of a content item for background playback based at least in part on whether the content item depicts a cover of a song. For example, process 300 (and/or any other suitable process) can determine that the content item is more likely to be suitable for background playback if process 300 (and/or any other suitable process) determines, based on one or more factors, that the content item depicts a cover version of a song. Process 300 (and/or any other suitable process) can determine that the content item depicts a cover version using any suitable technique or combination of techniques.

In some embodiments, process 300 (and/or any other suitable process) can determine the suitability of a content item for background playback based at least in part on a proportion of a work or works (e.g., a song or songs) included in the content item. For example, if the content item includes only a relatively short (e.g., ten seconds, twenty seconds, etc.) portion of a work and/or short portions of multiple works, process 300 (and/or any other suitable process) can determine that the content item is less likely to be suitable for background playback. Process 300 (and/or any other suitable process) can determine what proportion of a work is included in a content item using any suitable technique or combination of techniques.

In some embodiments, the suitability of a content item for background playback can be determined based on a combination of one or more of the factors described herein using any suitable technique or combination of techniques. For example, in some embodiments, various scores can be calculated for a content item based on one or more factors, and the scores can be weighted (and/or normalized) and combined to produce a suitability score. Such a suitability score can be compared to a suitability threshold to determine if the content item is suitable for background playback. As another example, in some embodiments, a content item can be determined to be unsuitable based on a single factor (e.g., the length of the content item being below a threshold length) regardless of whether one or more other factors indicate that the content item is likely to be suitable for background playback.

In some embodiments, different types of content can be evaluated using different factors and/or different criteria. For example, in some embodiments, content items that include music, such as music videos, slide shows with music as a background, etc., can be evaluated using many of the factors described herein. As another example, content items that include little or no music, and which are determined to be primarily dialogue (e.g., a video blog, a podcast, an audio book, etc.) can be evaluated using different factors and/or less stringent criteria (e.g., longer silences can be tolerated in a content item that is primarily dialogue than in a content item that is primarily music). As yet another example, content items that are advertisements (e.g., within another content item, between content items, etc.) can be evaluated using different factors. In a more particular example, if an advertisement includes no dialogue or lyrics, the advertisement may be unsuitable for presentation in background playback mode. As another more particular example, the advertisement can be associated with information (e.g., supplied by an advertiser) indicating if the advertisement is suitable for background playback. As yet another more particular example, the suitability of the advertisement for background playback can be determined based on a conversion rate associated with the advertisement when it is presented in background playback mode. In such an example, the conversion rate can be compared to a threshold conversion rate and/or to a conversion rate of the advertisement when it is presented in a non-background playback mode. In some embodiments, when an advertisement is determined not to be suitable for background playback, a substitute advertisement can be provided in its place. Additionally or alternatively, in some embodiments, presentation of advertisements can be inhibited in a background playback mode if a user associated with a user device that is presenting content in the background playback mode is subscribed to a background playback service.

At 312, if process 300 determines that the requested content is suitable for background playback ("YES" at 312), process 300 can move to 314. At 314, process 300 can cause the requested content to be transmitted to the user device that requested the content. Otherwise, if process 300 determines that the requested content it not suitable for background playback ("NO" at 312), process 300 can move to 316.

At 316, process 300 can cause the requested content to be skipped and/or can cause replacement content that is suitable to be transmitted to the user device instead of the requested content. In some embodiments, skipping the requested content can include selecting a next content item in a list (e.g., a playlist, a list of recommended content, etc.). Additionally or alternatively, in some embodiments, an indication that the requested content has been skipped can be communicated to the requesting user device using any suitable technique or combination of techniques.

In some embodiments, in cases in which process 300 skips the requested content, process 300 can cause a next content item in a list and/or any other suitable content item to be transmitted to the requesting user device (and/or be presented by the requesting user device). For example, if process 300 determines that a third content item in a playlist is not suitable for background playback, when the third content item is requested by a user device, process 300 can cause the fourth content item in the playlist to be transmitted to the user device, thereby skipping the third content item.

In some embodiments, if process 300 determines that a content item is not suitable for background playback, process 300 can cause a replacement content item to be transmitted in response to the request. Such a replacement item can include the same or similar content to the requested content item, but be more suitable for background playback. For example, if a requested content item is a video that includes a song, but the audio quality of the video is poor, process 300 can transmit a different video that includes the same song, but having better audio quality. In some embodiments, process 300 (and/or any other suitable process) can identify a replacement content item that includes the same or similar content using any suitable technique or combination of techniques. For example, a song can be associated with a content identifier based on an audio fingerprint, and the requested content item can be replaced with a new content item having the same content identifier. As another example, the requested content item can be replaced with a content item that includes an "official" version of the song in the requested content item. In some embodiments, process 300 (and/or any other suitable process) can determine that the replacement content item or next content item is suitable for background playback.

In some embodiments, when a content item that includes one or more songs is presented in a background playback mode, the one or more songs can be credited as being presented, while the visual portion of the content item can be inhibited from being credited with being presented. In such embodiments, this can facilitate discovery of content items that may be more popular for the audio data in the content item than the video data of the content item. For example, if a content item includes a slide show of images with a song included as a soundtrack, the slide show of images may not get many views, but in background playback the soundtrack may be a suitable version of the song for background playback and thus may be presented at a much higher rate in background playback mode.

Figure 4:
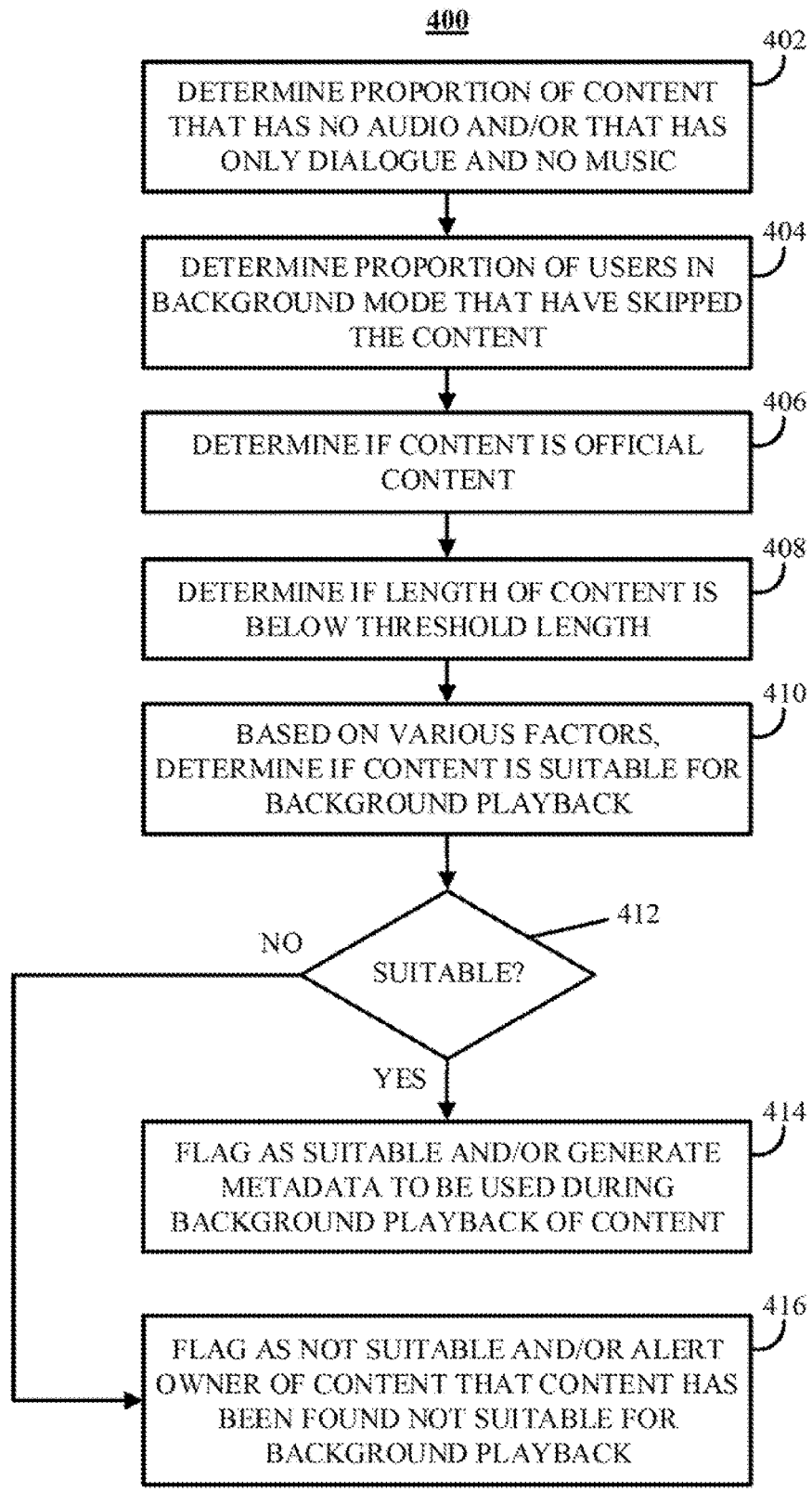
FIG. 4 shows an example of a process for determining if a content item is suitable for background playback in accordance with some embodiments of the disclosed subject matter.

FIG. 4 shows an example 400 of a process for determining if a content item is suitable for background playback in accordance with some embodiments of the disclosed subject matter. At 402, process 400 can determine a proportion of the content item that includes no audio and/or that includes dialogue with no music. Process 400 can use any suitable technique or combination of techniques to determine a proportion of the content item that includes dialogue and/or only silence (or only noise such as static). In some embodiments, if process 400 determines that there are significant portions (e.g., longer than one to two seconds) with no audio and/or only dialogue, those portions and their lengths can be flagged and/or otherwise indicated. In some embodiments, process 400 can determine a likelihood that the requested content item is suitable for background playback based on the number and/or lengths of portions that include only dialogue or silence. Additionally or alternatively, in some embodiments, if process 400 determines that the content item includes at least a threshold proportion of silence and/or dialogue, process 400 can determine that the content item is not suitable for presentation in a background playback mode. In some embodiments, silence and/or dialogue at a beginning and/or an end portion of the content item can be less indicative that the content item is not suitable for background playback than a portion in the middle that include dialogue or silence.

At 404, process 400 can determine a proportion of users that were presented with the content item in background playback mode who skipped ahead to the next item before the content item was finished being presented and/or before at least a substantial portion of the content item has been presented. Process 400 can make such a determination using any suitable technique or combination of techniques, such as techniques described above in connection with 310 of FIG. 3. In some embodiments, if process 400 determines that more than a threshold proportion of users have skipped the content item in background playback mode, process 400 can determine that the content item is not suitable for background playback. Additionally or alternatively, in some embodiments, if process 400 determines that the proportion of users that skipped the content item in background playback mode is at least a threshold amount higher than the proportion of users that skipped the content item in a non-background playback mode, process 400 can determine that the content item is not suitable for background playback. In some embodiments, process 400 can determine the likelihood that the content is suitable for presentation in background playback mode based on the proportion of users in background playback mode that skipped the content item, such that when more users have skipped the content item in background playback mode process 400 determines that the content item is less likely to be suitable for background playback.

At 406, process 400 can determine if the content item is an "official" version. As described above in connection with 310 of FIG. 3, whether a content item includes an "official" version of content can be a determined using any suitable technique or combination of techniques. In some embodiments, if a content item includes an "official" version of content, process 400 can determine that the content item is suitable for background playback. Alternatively, if a content item includes an "official" version of content, process 400 can determine that the content item is more likely to be suitable for background playback.

At 408, process 400 can determine if the overall length of the content is below a threshold length. In some embodiments, if the content item is below a threshold length, process 400 can determine that the content item is not suitable for background playback. Additionally or alternatively, in some embodiments, process 400 can compare the length to one or more thresholds, and based on how far from the threshold the length of the content is, process 400 can determine a likelihood that the content is suitable for background playback. In some embodiments, process 400 can use a combination of techniques. For example, if a video is shorter than twenty seconds, process 400 can determine that the video is not suitable for background playback. In such an example, if the video is more than twenty seconds, but less than one minute, process 400 can determine the likelihood that the video is suitable for background playback based on how far below the one minute threshold the video is.

At 410, process 400 can determine if the content item is suitable for background playback based on one or more of the factors determined at 402-408, and/or any other suitable factors. For example, process 400 can evaluate other factors described in connection 310 of FIG. 3 in combination with the factors described above in connection with 402-408. In some embodiments, process 400 can determine that the content item is suitable for background playback based on a single factor (e.g., because the content item includes an "official" version of content) and/or can determine that the content item is not suitable for background playback based on a single factor (e.g., the content item is shorter than a threshold length such as ten seconds). Additionally or alternatively, process 400 can generate a score for one or more of the factors, and combine the scores using any suitable weight values to generate a suitability score. Process 400 can then determine if the content is suitable based on the value of the suitability score.

If process 400 determines that the content item is suitable for background playback ("YES" at 412), process 400 can move to 414.

At 414, process 400 can indicate that the content item is suitable for background playback and/or can generate metadata (and/or any other suitable information) to be used during background playback of the content item. In some embodiments, process 400 can indicate that the content item is suitable for background playback by setting a flag, changing a value associated with the content item in a database, changing a value in identifying information of the content item used to request the content item, etc.

In some embodiments, the metadata can indicate portions of the content that are to be skipped (e.g., based on those portions including long silences), a content identifier of a song in the content item (e.g., which can be used to determine that the content item includes an identical song, a cover, etc., that is included in a content item that is not suitable for background playback and may require a replacement). Additionally, the metadata can include any other suitable information that can be used when presenting the content item in a background playback mode. In some embodiments, the metadata can be used by a user device that receives the song and/or can be used by a server responding to a request for content.

In some embodiments, if a content item is suitable for background playback except for the presence of a portion (or portions) that includes only silence or dialogue at the beginning and/or end of the content item, process 400 can cause an alternative version of the content item to be created that does not include those portions. In such embodiments, the alternative version can be presented in place of the original version when a user device is in a background playback mode.

Returning to 412, if process 400 determines that the content item is not suitable for background playback ("NO" at 412), process 400 can move to 416.

At 416, process 400 can indicate that the item is not suitable for background playback and/or can alert an owner and/or uploader of the content item that the content item has been determined to not be suitable for background playback. In some embodiments, process 400 can indicate that the content item is not suitable for background playback by setting a flag, changing a value associated with the content item in a database, changing a value in identifying information of the content item used to request the content item, etc.

In some embodiments, process 400 can generate metadata that can be used to identify a content item that is to be substituted for the content item that is not suitable for background playback. For example, the metadata can include a content identifier of a song in the content item which can be used to identify a content item that includes the same song but that is more suitable for background playback. As another example, the metadata can include identifying information of a content item that is to be substituted for the content item that is not suitable for background playback. In a more particular example, the identifying information can identify an alternate version of the content and/or a content item that includes similar if not identical content.

In some embodiments, process 400 can cause an owner and/or uploader of the content item that is not suitable for background playback to be notified that the content item has been determined to be not suitable for background playback. Any suitable technique or combination of techniques can be used to notify the owner and/or uploader of the content item. For example, an email can be sent to an email address associated with the owner and/or uploader of the content item. As another example, a message can be sent to the owner and/or uploader using a messaging function associated with a platform on which the content item is available (e.g., a video hosting service, a social network, etc.). In some embodiments, the notification can include information about why the content item was found to be not suitable for background playback and/or can include steps that the owner and/or uploader can take to make the content item more suitable for background playback. For example, process 400 can cause a message to be sent to the content owner and/or uploader indicating that the content item was determined to be not suitable for background playback because there is a long silence in the middle of the content item. As another example, process 400 can cause a message to be sent to the content owner and/or uploader indicating that the content item was determined to be not suitable for background playback because the content item has poor audio quality. Additionally, in some embodiments, when an owner and/or uploader uploads a content item and/or designates a portion of the content item as being suitable for background playback, process 400 (and/or any other suitable process) can determine if the content item (and/or portion of the content item) is suitable for presentation in background playback mode. In such embodiments, if process 400 (and/or any other suitable process) determines that the content item is not suitable for background playback, process 400 (and/or any other suitable process) can notify the owner and/or uploader that the content item is not suitable for background playback (and/or still not suitable for background playback). For example, if an owner and/or uploader designates a portion of the content item as suitable for background playback, process 400 (and/or any other suitable process) can determine whether the portion is suitable for background playback. In such an example, if the designated portion of the content item is still not suitable for background playback (e.g., based on poor audio quality), process 400 (and/or any other suitable process) can suggest that the owner and/or uploader can upload an alternate version of the content item that includes higher quality audio.

In some embodiments, the owner and/or uploader of a content item that is determined to be not suitable for background playback can specify one or more portions of the content item that the owner and/or uploader believes to be suitable for background playback. For example, the owner and/or uploader can designate a portion of a video that includes a song as being appropriate for background playback, while not designating introductory dialogue or a silence at the end as being appropriate for background playback (and/or designating those portions as not appropriate for background playback). In cases in which the owner and/or uploader of the content item makes such a designation, the content item can be reevaluated to determine if it is suitable for background playback. For example, a flag indicating that the content item is not suitable for background playback can be reset such that when the content item is requested, the content item is evaluated to determine if it is suitable for background playback.

Figure 5:
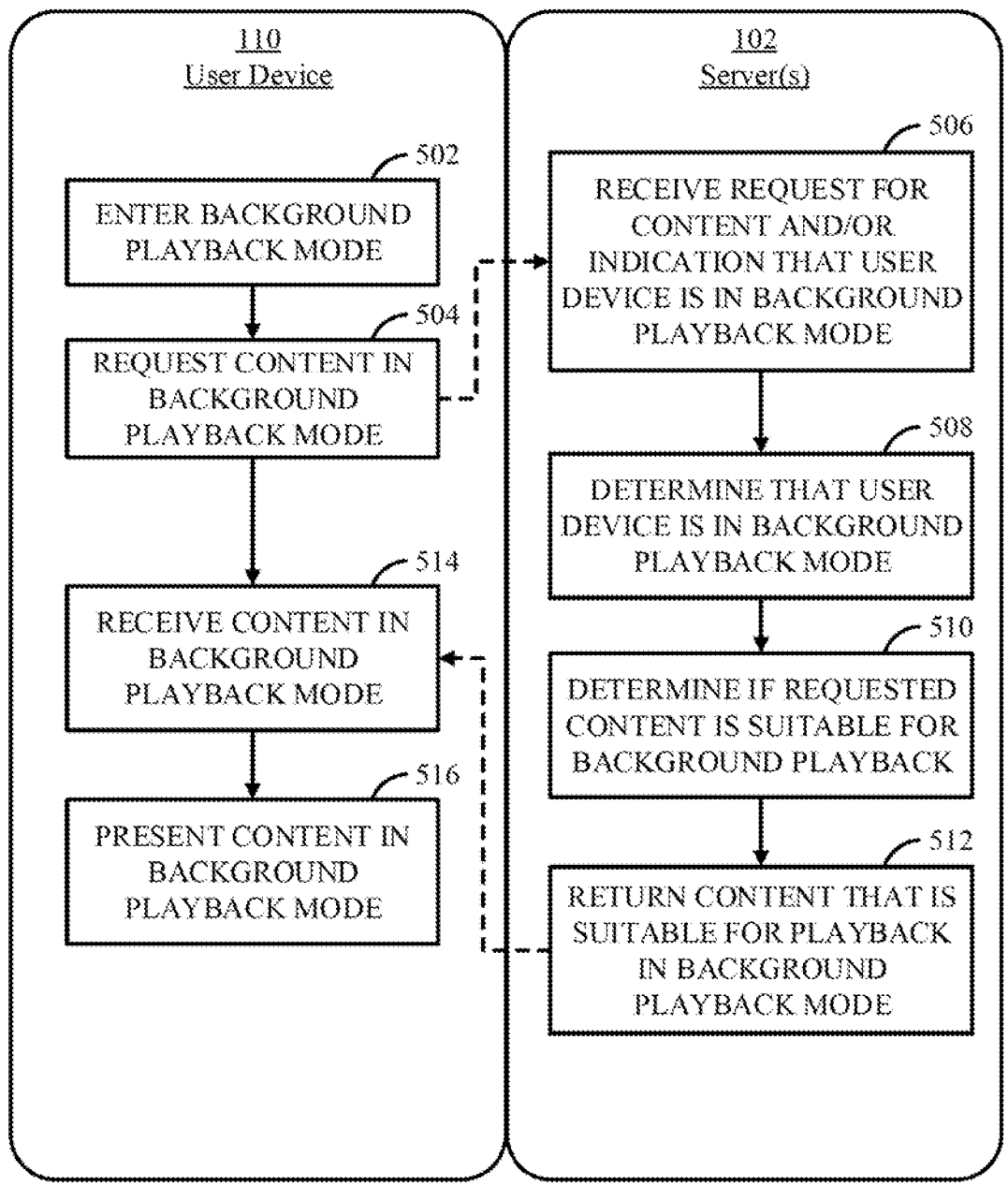
FIG. 5 shows an example of a data flow that can be used in conjunction with the processes described above in connection with FIGS. 3 and/or 4 in accordance with some embodiments of the disclosed subject matter.

FIG. 5 shows an example 500 of a data flow that can be used in conjunction with the processes described above in connection with FIG. 3 in accordance with some embodiments of the disclosed subject matter. At 502, user device 110 can enter a background playback mode. In some embodiments, user device 110 can enter background playback mode using any suitable technique or combination of techniques and in response to any suitable sensor output, user input, etc. As described above in connection with 304 of FIG. 3, user device 110 and/or an application being executed by user device 110 can enter a background playback mode when a user interface of an application being used to present content is no longer being presented on a display of user device 110. For example, in some embodiments, user device 110 and/or the application being executed by user device 110 can enter background playback mode in response to the application being minimized, the user interface of the application being toggled to a mini view, user device 110 being locked, the display of user device 110 being deactivated, etc.

Additionally or alternatively, in some embodiments, user device 110 and/or the application being executed by user device 110 can enter background playback mode in response to user device 110 being controlled by another device and/or being connected to another device when a display of user device 110 is obscured or turned off. Such another device can be any suitable device such as a wearable computing device (e.g., a smartwatch, a computing device associated with glasses, etc.), an in-vehicle computing device (e.g., an in-dash vehicle entertainment system), etc.

In some embodiments, user device 110 and/or the application being executed by user device 110 can enter background playback mode in response to determining that user device 110 is in a location associated with background playback and/or that a user carrying user device 110 is likely in a situation in which background playback is preferred. For example, if user device 110 is traveling at a speed that corresponds to non-motorized transportation (e.g., walking, running, bicycling, etc.), user device 110 and/or the application being executed by user device 110 can enter background playback mode by default. As another example, if user device 110 is traveling at a speed that corresponds to motorized transportation (e.g., riding in a car, a bus, a train, etc.), user device 110 and/or the application being executed by user device 110 can enter background playback mode by default.

In some embodiments, when user device 110 and/or the application being executed by user device 110 enters background playback mode, an indication can be presented to a user that user device 110 and/or the application is in background playback mode. For example, user device 110 can present a message on a home screen (e.g., in cases in which user device 110 is a smartphone, tablet, etc.). As another example, user device 110 can present an indication in a notification that is presented in a notification center of user device 110. As yet another example, user device 110 can present an indication in a system tray, a taskbar and/or any other suitable location indicating that user device 110 and/or the application being executed by user device 110 is in a background playback mode.

In some embodiments, when user device 110 is in a situation where background playback is often be entered, a notification can be presented to the user that content can be presented in background playback mode. Such a notification can be presented using a display of user device 110 and/or a display of a connected device (e.g., a wearable computing device, an in-vehicle computing device, etc.).

At 504, user device 110 can request content for presentation while in background playback mode. In some embodiments, a request for content can be any suitable request, such as a request for a particular content item, a request for one or more content items that meet one or more criteria, a request for a next content item on a playlist, a request for a recommended item of content, etc. In some embodiments, such a request can be sent automatically based on instructions of an application that is being used to present the content. For example, when a current content item finishes being presented, user device 110 can request a next content item. Such a next content item can be a next content item in a playlist, a next recommended content item, etc. As another example, when an application for presenting content items in background playback mode is launched a last content item that was being presented can be automatically presented and/or a new content item based on a last content item that was being presented (e.g., as a recommendation, as part of a playlist, etc.) can be automatically presented. Additionally or alternatively, such a request can be sent in response to one or more user inputs. For example, a user can enter a search query for one or more content items and can select a particular content item or content items (e.g., as a playlist) from search results. As another example, a user can provide input to skip to a next content item or to go back to a previous content item. In some embodiments, such a request can be sent by user device 110 to any suitable destination using any suitable technique or combination of techniques, such as by sending a Hypertext Transfer Protocol (HTTP) request to a content server, by sending a request using an application that is presenting the content in background playback mode to a content server, etc. In some embodiments, a request can be associated with an indication that user device 110 is in background playback mode. Additionally or alternatively, an indication that user device 110 is in background playback mode can be sent at any suitable time (e.g., when user device 110 enters background playback mode), periodically, etc., and may not be associated with a particular request for content.

At 506, server 102 can receive the request for content and/or an indication that the user device is in a background playback mode. In some embodiments, the request can be received using any suitable technique or combination of techniques. In some embodiments, server 102 can receive an indication that user device 110 is in background playback mode at any suitable time and using any suitable technique or combination of techniques. Additionally, in some embodiments, server 102 can store information indicating that user device 110 is in background playback mode until such time as an indication is received that user device 110 is no longer in background playback mode. The indication can be received in any form, and, in some embodiments, can be information that can be used by server 102 to determine that user device 110 is in background playback mode (e.g., as described above in connection with 304 of FIG. 3), in addition to or in lieu of an explicit indication At 508, server 102 can determine that user device 110 is in background playback mode. Server 102 can use any suitable technique or combination of techniques to determine that user device 110 is in background playback mode, such as techniques described above in connection with 304 of FIG. 3.

At 510, server 102 can determine if the requested content is suitable for background playback. Server 102 can use any suitable technique or combination of techniques to determine if the requested content is suitable for background playback, such as techniques described above in connection with 310 of FIG. 3 and/or process 400 of FIG. 4.

At 512, server 102 can transmit content that is suitable for background playback to user device 110. In some embodiments, the content transmitted by server 102 at 512 can be the requested content. Alternatively, if the requested content is determined to be not suitable for background playback at 510, server 102 can transmit substitute and/or alternate content (e.g., as described above in connection with 316 of FIG. 3 and/or 416 of FIG. 4). In some embodiments, the content can be transmitted using any suitable technique or combination of techniques. For example, the content can be transmitted using techniques for streaming content to user device 110. As another example, the content can be downloaded to user device 110 and stored. In some embodiments, if the content item to be transmitted is already stored on user device 110, server 102 can cause the content item to be presented in lieu of transmitting the content.

At 514, user device 110 can receive the content item in background playback mode. In some embodiments, user device 110 can use any suitable technique or combination of techniques to receive the content item.

At 516, user device 110 can present the content in background playback mode. In some embodiments, user device 110 can present the received content in background playback mode using any suitable technique or combination of techniques. For example, user device 110 can present an audio portion of the content without presenting a video portion of the content. As another example, user device 110 can present information identifying content that is being presented (e.g., such as title information, performer information, a thumbnail associated with the content item, etc.). In such an example, such identifying information can be presented in some user interfaces such as on a lock screen of user device 110, in a notification center of user device 110, in a task bar of user device 110, in a mini view of the application being used to present the content, etc. In some embodiments, user device 110 can present controls for controlling whether to pause the content being presented in background playback mode, skip to a next content item, go back to a previous content item, etc., in some user interfaces.

Figure 6B:
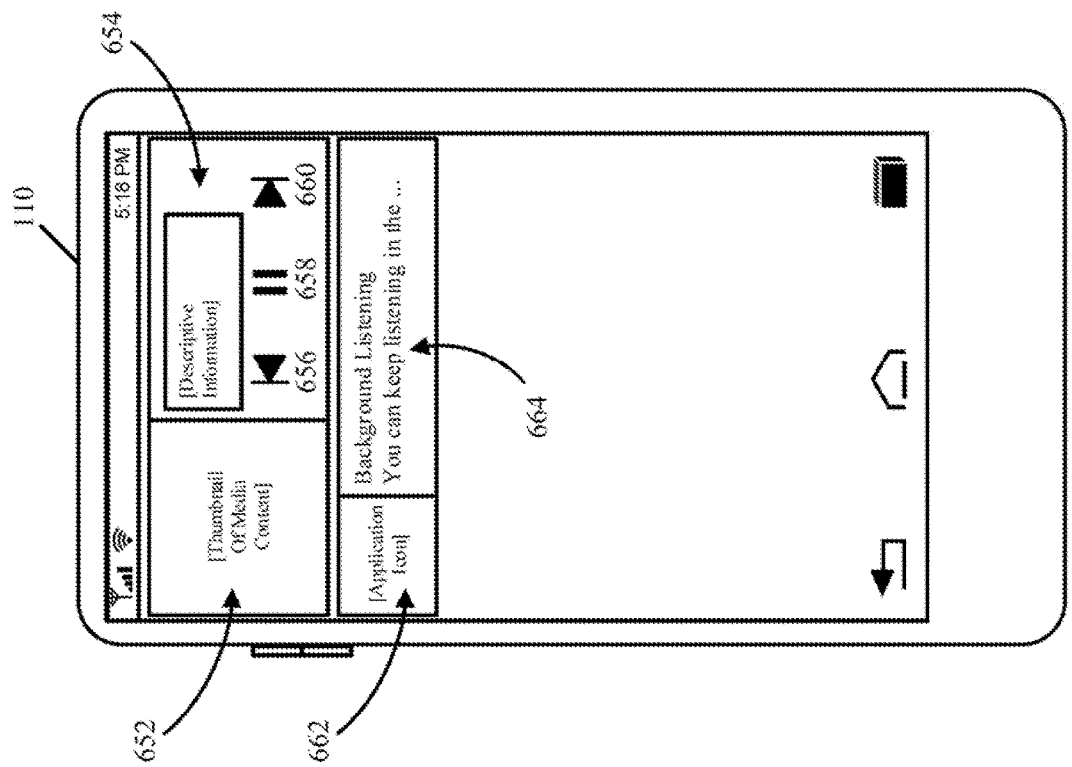
FIGS. 6A and 6B show examples of user interfaces for presenting a content item and associated information in a background playback mode in accordance with some embodiments of the disclosed subject matter.
Figure 6A:
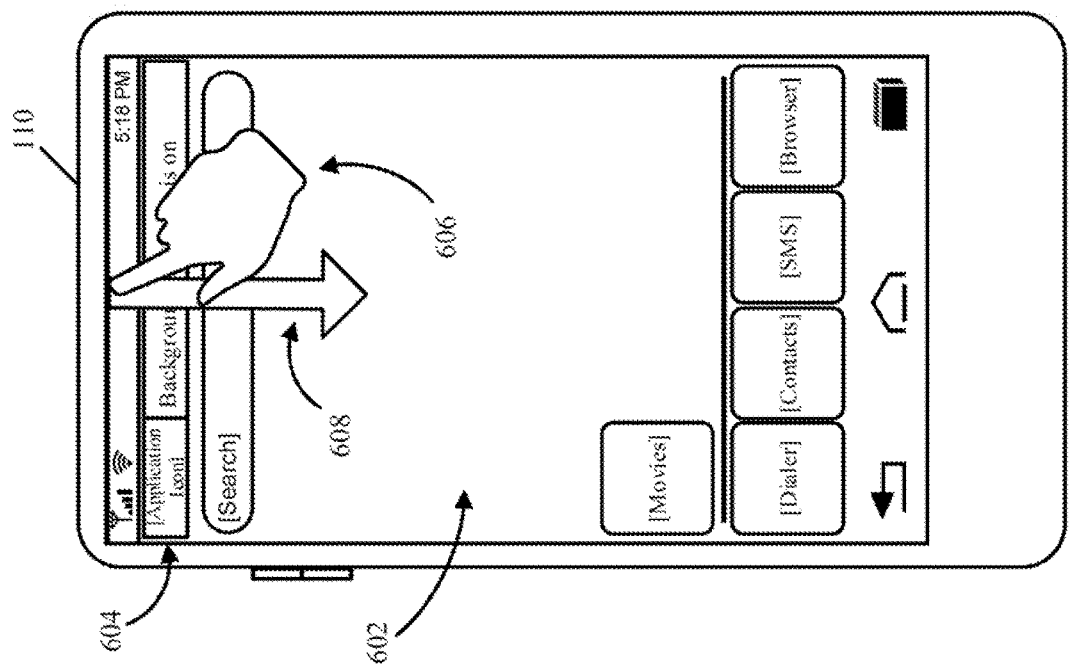

FIG. 6A shows an example of a user device 110 presenting a user interface of a home screen while in a background playback mode in accordance with some embodiments of the disclosed subject matter. As shown in FIG. 6A, user device 110 can present a home screen 602 that can include various user interface elements for example, performing a search, launching applications, etc. In some embodiments, when an application is being executed by user device 110 to present content in background playback mode, home screen 602 can include a background playback indication 604 that indicates that a particular application is presenting content in background playback mode. In some embodiments, user input selecting background playback indication 604 can cause a user interface of the application presenting the content to be presented. Additionally, in some embodiments, user input providing a swiping gesture from a top of a display of user device 110 (e.g., as shown by hand 606 and arrow 608) can cause a user interface for a notification center of an operating system of user device 110 to be presented.

FIG. 6B shows an example of user device 110 presenting a user interface including information identifying content that is currently being presented, and information identifying that the user device is presenting the content in a background playback mode of a particular application in accordance with some embodiments of the disclosed subject matter. As shown in FIG. 6B, user device 110 can present one or more notifications, which can include a first notification which includes a thumbnail 652 associated with a content item that is currently being presented, descriptive information 654 of the content item that is currently being presented and controls 656-660 for controlling playback by an application that is currently presenting the content in the background playback mode. In some embodiments, the notifications can also include a second notification that includes an icon 662 of the application that is currently presenting content in background playback mode, and information 664 informing a user that application 662 is currently presenting content in background playback mode.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 212 and/or hardware processor 222) to execute the mechanisms described herein. For instance, these mechanisms can encompass a computer program written in a programming language recognizable by user device 110, and/or server 102 that is executing the mechanisms (e.g., a program written in a programming language, such as, Java, C, Objective-C, C++, C #, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about content that is being requested by user device 110, information about requests for content from user device 110 stored on a remote device such as server 102, etc.), or to control whether and/or how to information about user requests for content are used. In addition, certain data can be treated in one or more ways before it is stored or used, so that personal information is removed. For example, a user's identity can be treated so that no personal information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3-5 can be executed or performed in any order or sequence not limited to the order and sequence shown and described in the figures. Also, some of the above steps of the processes of FIGS. 3-5 can be executed or performed substantially simultaneously where appropriate or in parallel to reduce latency and processing times. Furthermore, it should be noted that FIGS. 3-5 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for providing video content suitable for audio-only playback are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for selecting content to be presented, the method comprising:
   receiving, using a hardware processor, a request for a first video content item from a user device;
   determining, using the hardware processor, whether the first video content item is suitable for presentation in a background playback mode in which audio data of video content items is played back and in which video data of the video content items is inhibited from being played back; and
   in response to determining that the first video content item is not suitable for presentation in the background playback mode, setting, using the hardware processor, a background playback mode indicator associated with the first video content item to indicate that the first video content item is not suitable for presentation in the background playback mode and selecting a second video content item in which the background playback mode indicator associated with the second video content item indicates that the second video content item is suitable for presentation in the background playback mode.

2. The method of claim 1, wherein the first video content is determined to be suitable for presentation in the background playback mode based on one or more properties of audio data of the first video content item.

3. The method of claim 1, further comprising setting a second background playback mode indicator associated with the second video content item as being suitable for presentation in the background playback mode based on one or more properties of audio data of the second video content item.

4. The method of claim 1, further comprising determining that the user device is currently in the background playback mode prior to determining whether the first video content item is suitable for presentation in the background playback mode.

5. The method of claim 1, further comprising automatically causing the audio data of the second video content item to be presented by the user device while inhibiting video data of the second video content item from being presented by the user device.

6. The method of claim 1, wherein determining that the first video content item is not suitable for presentation in the background playback mode comprises:
   determining a proportion of audio data of the first video content item that does not include music;
   determining a proportion of users that skipped the first video content item when the users were presented with the first video content item in the background playback mode; and
   based on at least the proportion of the audio data of the first video content item that does not include music and the proportion of users that skipped the first video content item, determining that the first video content item is not suitable for presentation in the background playback mode.

7. The method of claim 1, further comprising, in response to the determining that the first video content item is not suitable for presentation in the background playback mode, causing a user associated with the first video content item to be notified that the first video content item is not suitable for background playback.

8. The method of claim 1, further comprising:
determining that an end portion of the second video content item includes no music; and
causing the user device to skip presentation of the end portion that includes no music.

9. The method of claim 1, wherein the request for the first video content item is a request for a next video content item in a playlist of video content items, and wherein the second video content item is the next video content item in the playlist after the first video content item.

10. A system for selecting content to be presented, the system comprising:
a hardware processor that:
receives a request for a first video content item from a user device;
determines whether the first video content item is suitable for presentation in a background playback mode in which audio data of video content items is played back and in which video data of the video content items is inhibited from being played back; and
in response to determining that the first video content item is not suitable for presentation in the background playback mode, sets a background playback mode indicator associated with the first video content item to indicate that the first video content item is not suitable for presentation in the background playback mode and selects a second video content item in which the background playback mode indicator associated with the second video content item indicates that the second video content item is suitable for presentation in the background playback mode.

11. The system of claim 10, wherein the first video content is determined to be suitable for presentation in the background playback mode based on one or more properties of audio data of the first video content item.

12. The system of claim 10, wherein the hardware processor further sets a second background playback mode indicator associated with the second video content item as being suitable for presentation in the background playback mode based on one or more properties of audio data of the second video content item.

13. The system of claim 10, wherein the hardware processor further determines that the user device is currently in the background playback mode prior to determining whether the first video content item is suitable for presentation in the background playback mode.

14. The system of claim 10, wherein the hardware processor further automatically causes the audio data of the second video content item to be presented by the user device while inhibiting video data of the second video content item from being presented by the user device.

15. The system of claim 10, wherein determining that the first video content item is not suitable for presentation in the background playback mode comprises:

determining a proportion of audio data of the first video content item that does not include music;
determining a proportion of users that skipped the first video content item when the users were presented with the first video content item in the background playback mode; and
based on at least the proportion of the audio data of the first video content item that does not include music and the proportion of users that skipped the first video content item, determining that the first video content item is not suitable for presentation in the background playback mode.

16. The system of claim 10, wherein the hardware processor further, in response to the determining that the first video content item is not suitable for presentation in the background playback mode, causes a user associated with the first video content item to be notified that the first video content item is not suitable for background playback.

17. The system of claim 10, wherein the hardware processor further:
determines that an end portion of the second video content item includes no music; and
causes the user device to skip presentation of the end portion that includes no music.

18. The system of claim 10, wherein the request for the first video content item is a request for a next video content item in a playlist of video content items, and wherein the second video content item is the next video content item in the playlist after the first video content item.

19. A non-transitory computer-readable medium containing computer executable instructions that, when executed by a processor, cause the processor to perform a method for selecting content to be presented, the method comprising:
receiving a request for a first video content item from a user device;
determining whether the first video content item is suitable for presentation in a background playback mode in which audio data of video content items is played back and in which video data of the video content items is inhibited from being played back; and
in response to determining that the first video content item is not suitable for presentation in the background playback mode, setting a background playback mode indicator associated with the first video content item to indicate that the first video content item is not suitable for presentation in the background playback mode and selecting a second video content item in which the background playback mode indicator associated with the second video content item indicates that the second video content item is suitable for presentation in the background playback mode.

* * * * *